United States Patent
Ikuta et al.

(10) Patent No.: US 10,793,388 B2
(45) Date of Patent: Oct. 6, 2020

(54) FEEDER ARRANGEMENT SUPPORT SYSTEM AND METHOD FOR SUPPORTING FEEDER ARRANGEMENT

(71) Applicant: Panasonic Intellectual Property Management Co., Ltd., Osaka (JP)

(72) Inventors: Naofumi Ikuta, Osaka (JP); Takuya Yamazaki, Fukuoka (JP); Hiroki Sagara, Fukuoka (JP); Isato Iwata, Fukuoka (JP)

(73) Assignee: PANASONINC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/705,706

(22) Filed: Sep. 15, 2017

(65) Prior Publication Data
US 2018/0086592 A1    Mar. 29, 2018

(30) Foreign Application Priority Data

Sep. 28, 2016    (JP) .................................. 2016-189073

(51) Int. Cl.
*B65H 43/08*    (2006.01)
*B65H 16/00*    (2006.01)
(Continued)

(52) U.S. Cl.
CPC ............. *B65H 43/08* (2013.01); *B65H 16/00* (2013.01); *H04N 5/23293* (2013.01);
(Continued)

(58) Field of Classification Search
CPC ........................... G06T 7/0004; G02B 17/008
See application file for complete search history.

(56) References Cited

U.S. PATENT DOCUMENTS 9,299,013 B1    3/2016    Curlander et al.
9,632,313 B1    4/2017    Madan et al.
(Continued)

FOREIGN PATENT DOCUMENTS

CN    104349658 A    2/2015
JP    2006-237566 A    9/2006
(Continued)

OTHER PUBLICATIONS

DHL ("Vision Picking at DHL-Augmented Reality in Logistics", 2015, https://www.youtube.com/watch?time_continue=11&v=I8vYrAUb0BQ) (Year: 2015).
(Continued)

*Primary Examiner* — William C Vaughn, Jr.
*Assistant Examiner* — Jerry T Jean Baptiste
(74) *Attorney, Agent, or Firm* — Pearne & Gordon LLP

(57) ABSTRACT

A feeder arrangement support system for supporting an arrangement of a feeder on a feeder arrangement unit includes a imaging unit that images information, a processor that superimposes arrangement support information for supporting the feeder arrangement on the feeder arrangement unit on an image obtained by imaging the feeder arrangement unit or a field of view of a worker, to generate a superimposed composite image, and a display that displays the superimposed composite image.

12 Claims, 9 Drawing Sheets

(51) Int. Cl.
*H04N 5/232* (2006.01)
*H04N 5/265* (2006.01)
*H04N 5/262* (2006.01)
*G06T 7/00* (2017.01)

(52) U.S. Cl.
CPC .......... *H04N 5/265* (2013.01); *H04N 5/2621* (2013.01); *G06T 7/0004* (2013.01); *G06T 2207/30164* (2013.01)

(56) References Cited

U.S. PATENT DOCUMENTS

| | | | |
|---|---|---|---|
| 2007/0270992 | A1 | 11/2007 | Nishida et al. |
| 2015/0039115 | A1* | 2/2015 | Sagara ............... H05K 13/0853 700/106 |
| 2015/0192774 | A1* | 7/2015 | Watanabe ............ G06Q 10/087 345/8 |
| 2015/0310617 | A1 | 10/2015 | Hara |
| 2016/0125757 | A1 | 5/2016 | Maenishi et al. |

FOREIGN PATENT DOCUMENTS

| | | |
|---|---|---|
| JP | 2014-043353 A | 3/2014 |
| JP | 2014-122075 A | 7/2014 |
| JP | 2015-028970 A | 2/2015 |
| JP | 2015-211363 A | 11/2015 |
| JP | 2016-056024 A | 4/2016 |
| JP | 2016-092047 A | 5/2016 |

OTHER PUBLICATIONS

Arox ("Smart glasses order picking innovation in warehouse and logistics", Apr. 21, 2016, https://www.youtube.com/watch?v=sGBNpvqT-kc) (Year: 2016).

Amutha, Karuppiah Pal, Chidambaram Sethukkarasi, and Raja Pitchiah. "Smart kitchen cabinet for aware home." SMART 2012, The First International Conference on Smart Systems, Devices and Technologies. 2012 (Year: 2012).

Kiyokawa, Kiyoshi. "A wide field-of-view head mounted projective display using hyperbolic half-silvered mirrors." Proceedings of the 2007 6th IEEE and ACM International Symposium on Mixed and Augmented Reality. IEEE Computer Society, 2007.

Chinese Search Report dated Jun. 3, 2020 for the related Chinese Patent Application No. 201710862704.3.

* cited by examiner

FIG. 5

| Work instruction information 53a | | | | | | | |
|---|---|---|---|---|---|---|---|
| Work sequence 71 | Operation type | Current state 72 | 73 | Next production 74 | Component name 75 | Reel 76 | Number of necessary components 77 | Comment 78 |
| 1 | Detachment | 1-13R | ⇑ | Reuse | P1005A | P0802S | 500 | Shelf A1 |
| 2 | Movement | 1-14R | ⇑ | 1-2L | P1005A | P0810B | 2500 | |
| 3 | Detachment | 1-15R | ⇑ | Reuse | P1005A | P0802C | 150 | Shelf A1 |
| 4 | Detachment | 1-15L | ⇑ | Reuse | P1005B | P0832S | 2500 | Shelf A2 |
| 5 | Attachment | New | ⇑ | 1-13R | P1005C | P0833F | 200 | |
| 6 | Attachment | New | ⇑ | 1-14R | P1005D | P0822A | 1500 | |
| 7 | Attachment | New | ⇑ | 1-15R | P1005E | P0802P | 1500 | |
| 8 | Attachment | New | ⇑ | 1-15L | P1005F | P0814S | 1500 | |
| 9 | Detachment | 2-7L | ⇑ | Reuse | P1005B | P0814T | 1500 | Shelf A2 |
| 10 | Detachment | 2-10R | ⇑ | Reuse | P1005D | P0826H | 1500 | Shelf B3 |
| 11 | Attachment | New | ⇑ | 2-7L | P1005C | P0850D | 1500 | |
| 12 | Attachment | New | ⇑ | 2-10R | P1005A | P0810A | 1500 | |
| 13 | Attachment | New | ⇑ | 2-16L | P1005E | P0843J | 1500 | |

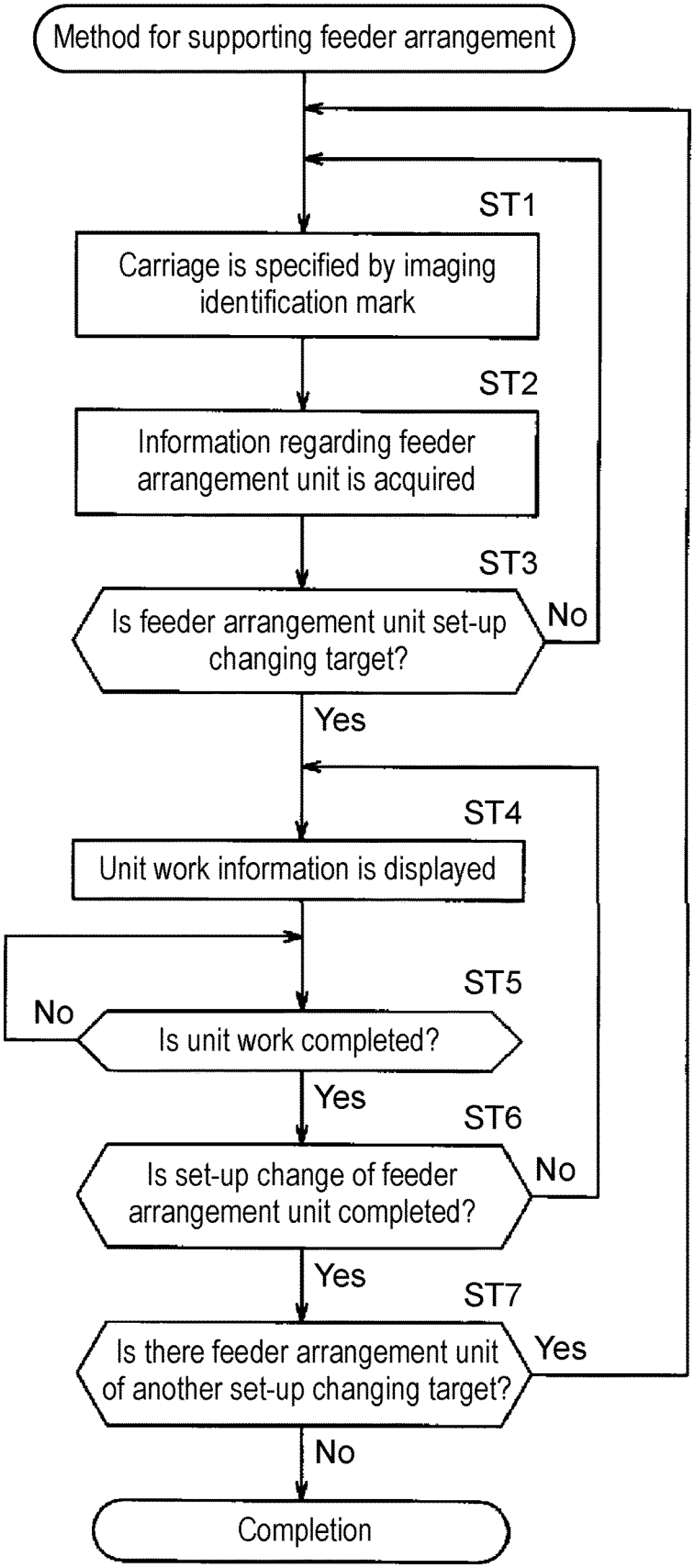

FEEDER ARRANGEMENT SUPPORT SYSTEM AND METHOD FOR SUPPORTING FEEDER ARRANGEMENT

BACKGROUND

1. Technical Field

The present disclosure relates to a feeder arrangement support system and a method for supporting a feeder arrangement for supporting a feeder arrangement on a feeder arrangement unit.

2. Description of the Related Art

A plurality of feeders such as tape feeders supplying components are provided in a feeder arrangement unit of a component mounter included in a component mounting system for each component type. When a board type to be produced is switched, in order to supply a component necessary for production of a new board type, so-called set-up changing work including detachment of an already arranged feeder, a change of the arrangement, and attachment of a new feeder is executed. The set-up changing work is complicated work including complicated contents in which many board types or component types are targeted. Various proposals have been made for supporting a worker by displaying various types of auxiliary information on a display screen provided in a component mounter or the like for the purpose of improving efficiency of such set-up changing work (for example, see Japanese Patent Unexamined Publication No. 2015-28970).

In Japanese Patent Unexamined Publication No. 2015-28970, in order to change an arrangement state of current feeders to an arrangement state of feeders for production of a new board type, work instruction information sorted according to a work sequence to be executed by the worker is displayed on the display screen provided in the component mounter or the like.

SUMMARY

A feeder arrangement support system of the disclosure is a feeder arrangement support system which supports an arrangement of a feeder on a feeder arrangement unit, the system including an imaging unit that images information; a processor that generates a superimposed composite image by superimposing arrangement support information for supporting the feeder arrangement on the feeder arrangement unit on an image obtained by imaging the feeder arrangement unit or a field of view of a worker; and a display that displays the superimposed composite image.

A method for supporting a feeder arrangement of the disclosure is a method for supporting a feeder arrangement for supporting an arrangement of a feeder on a feeder arrangement unit, the method including preparing arrangement support information for supporting the feeder arrangement on the feeder arrangement unit; generating a superimposed composite image by superimposing the arrangement support information on an image obtained by imaging the feeder arrangement unit or a field of view of a worker; and displaying the superimposed composite image on a display.

According to the disclosure, a worker can intuitively grasp set-up changing work.

BRIEF DESCRIPTION OF THE DRAWINGS

FIG. 5 is an explanatory view of work instruction information of set-up changing work in the component mounting system of an embodiment of the disclosure;

FIG. 8 is a flow diagram of a method for supporting a feeder arrangement on the component mounting system of an embodiment of the disclosure.

DETAILED DESCRIPTION

Prior to describing an embodiment, problems in the related art will be briefly described.

In the related art including Japanese Patent Unexamined Publication No. 2015-28970, since it is necessary for a worker to proceed work while comparing and confirming contents of work instruction information displayed on a display screen with a feeder arrangement on a feeder arrangement unit, there is a problem that further improvement is necessary for the worker to intuitively grasp the work.

An object of the disclosure is to provide a feeder arrangement support system and a method for supporting a feeder arrangement capable of intuitively grasping set-up changing work by a worker and reducing labor of finding feeders.

Figure 2:
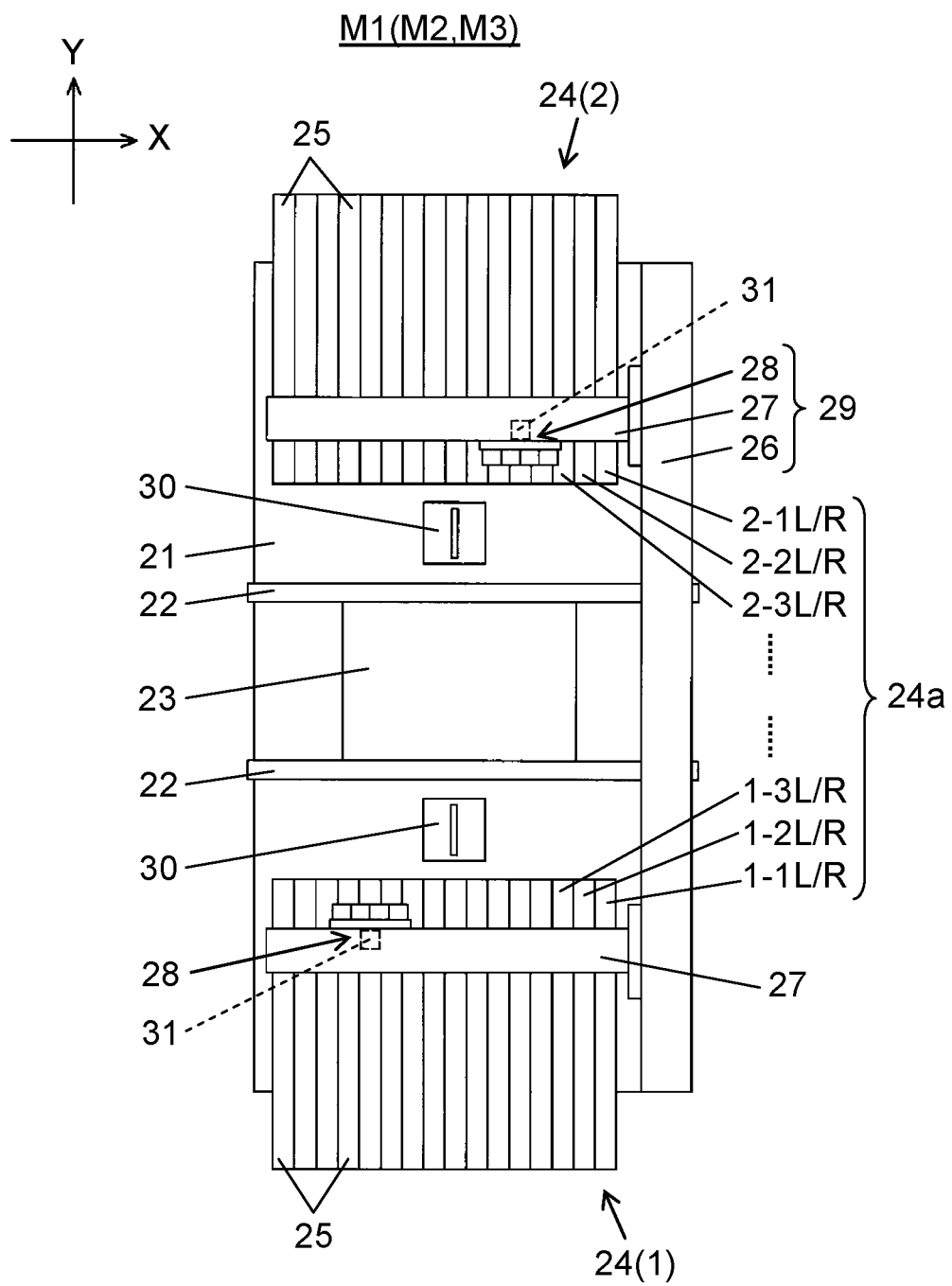
FIG. 2 is a plan view of a component mounter of an embodiment of the disclosure.
Figure 3A:
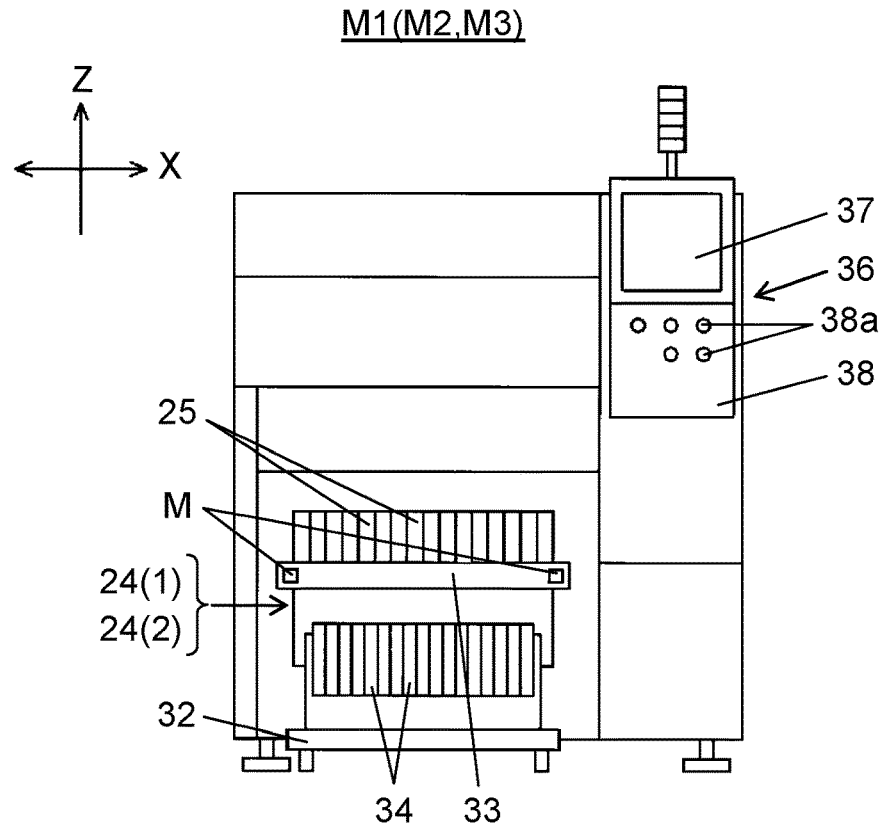
FIG. 3A is an explanatory view of a configuration of a feeder arrangement unit in the component mounter of an embodiment of the disclosure.
Figure 3B:
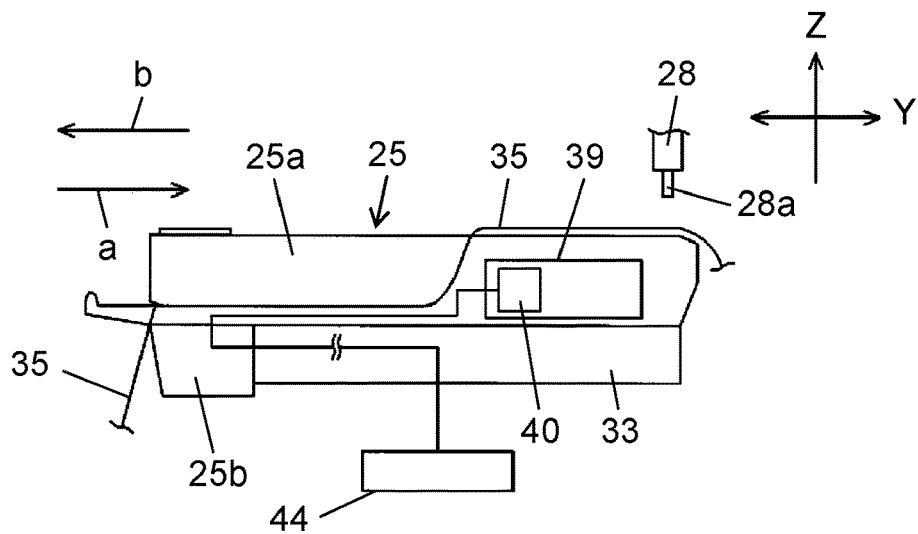
FIG. 3B is an explanatory view of a configuration of a tape feeder in the component mounter of an embodiment of the disclosure.

Hereinafter, an embodiment of the disclosure will be described in detail with reference to the drawings. Configurations, shapes, and the like described below are examples for explanation, and can be appropriately changed in accordance with the specification of the component mounting system (feeder arrangement support system). In the following description, the same reference numerals are given to corresponding elements in all drawings and redundant explanations will be omitted. In FIG. 2 and in a part to be described later, as two axial directions orthogonal to each other in a horizontal plane, an X direction (rightward and leftward direction on a paper surface in FIG. 2) indicates a board transport direction and a Y direction (upward and downward direction in FIG. 2) indicates a direction orthogonal to the board transport direction. In FIGS. 3A and 3B, a Z direction (upward and downward direction in FIGS. 3A and 3B) indicates a height direction orthogonal to the horizontal plane. The Z direction is the upward and downward direction or the orthogonal direction in a case where the component mounter is provided on the horizontal plane.

Figure 1:
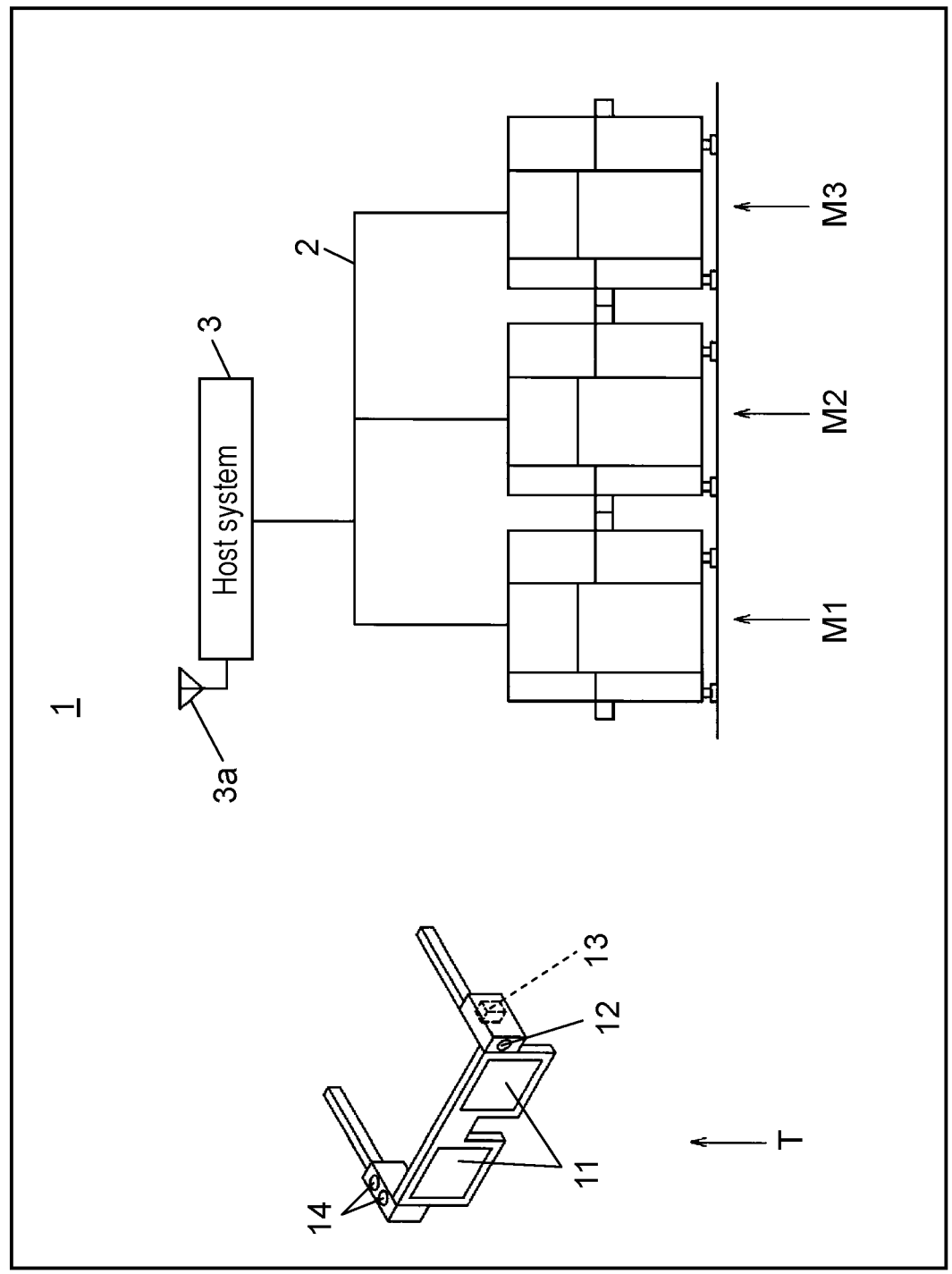
FIG. 1 is an explanatory view of a configuration of a component mounting system of an embodiment of the disclosure.

First, a configuration of component mounting system 1 will be described with reference to FIG. 1. Component mounting system 1 has a function of manufacturing a mounting board by mounting a component on a board. Component mounting system 1 has a configuration in which a plurality of component mounters M1 to M3 are connected to each other by communication network 2 and the whole is controlled by host system 3. Component mounting system 1 includes information terminal T performing wireless communication with host system 3. Host system 3 includes host-side communicator 3a performing wireless communication with information terminal T.

Component mounters M1 to M3 mount the components on the boards on which solder for component joining is printed by a solder printing apparatus (not illustrated). Component mounters M1 to M3 have board transport mechanisms for transporting the boards and the board transport mechanisms are connected in series to form a board transport path. Component mounters M1 to M3 sequentially transport the boards along the board transport path and execute component mounting work.

Information terminal T is an eyeglass type wearable terminal, a head mounted display, or the like, and includes display 11, camera 12, terminal-side communicator 13, and input unit 14. Display 11 includes a half mirror and a projection device. In a state of wearing information terminal T, a worker can simultaneously see a status outside information terminal T passed through the half mirror and various types of information projected onto the half mirror by the projection device.

That is, display 11 displays various types of information in a field of view of the worker to be superimposed. Display 11 may be any display capable of displaying various types of information to be superimposed in the field of view of the worker and may, for example, directly project various types of information onto the eyeball of the worker. Display 11 may be mounted only on one eye of the worker.

Camera 12 is an imaging unit which images a moving image or a still image. A lens of camera 12 is provided to image a direction of the field of view of the worker wearing information terminal T. Therefore, camera 12 images a direction facing a face of the worker wearing information terminal T. Terminal-side communicator 13 performs wireless communication with host system 3. Input unit 14 is an input device such as a button, a touch sensor, or a vibration sensor, and is used for inputting instructions by the worker. Input unit 14 may be any device capable of inputting instructions from the worker, for example, may be even a voice input device via a microphone (not illustrated), or may be a motion input device by a movement of the hand of the worker imaged by camera 12, or the like.

Next, structures of component mounters M1 to M3 will be described with reference to FIGS. 2, 3A, and 3B. Component mounters M1 to M3 have the same configuration and component mounter M1 will be described here. In FIG. 2, board transport mechanism 22 is disposed on base 21 in the X direction. Board transport mechanism 22 transports board 23 on which components are mounted using a conveyor and board 23 is provided on board transport mechanism 22 to be positioned at a mounting working position.

Component supplier 24(1) is provided on a front side of board transport mechanism 22 and component supplier 24(2) is provided on a rear side of board transport mechanism 22. A plurality of part feeders for supplying components are mounted side by side on component suppliers 24(1) and 24(2). Feeder addresses 24a for specifying mounting positions of the part feeders are set in component suppliers 24(1) and 24(2). In the example illustrated in the embodiment, 1-1L/R, 1-2L/R, 1-3L/R, . . . are set from a downstream side (right side in FIG. 2) to an upstream side as feeder addresses 24a in component supplier 24(1). It is possible to individually specify the part feeders mounted on component mounter M1 by designating feeder addresses 24a.

Similarly, 2-1L/R, 2-2L/R, 2-3L/R, . . . are set from the downstream side to the upstream side as feeder addresses 24a in component supplier 24(2). A sequence setting method in feeder addresses 24a is arbitrary and an address order of component suppliers 24(1) and 24(2) may be set to be reversed.

Here, an example, in which tape feeders 25 having a function of pitch-feeding a carrier tape holding a component to be mounted as the part feeders are mounted, is illustrated. A component is supplied to a component suction position by suction nozzle 28a (see FIG. 3B) of mounting head 28, which is described below, by driving tape feeders 25.

Y-axis beam 26 including a linear drive mechanism is disposed at an end portion on an upper surface of base 21 on one side in the X direction. Two X-axis beams 27 similarly including linear drive mechanisms are coupled to Y-axis beam 26 so as to be freely moved in the Y direction. Mounting heads 28 are respectively mounted on two X-axis beams 27 so as to be freely moved in the X direction. Mounting heads 28 include a plurality of holding heads and suction nozzles 28a, which suck and hold the components and can be individually raised and lowered, are mounted on lower end portions of the holding heads.

Mounting head 28 is moved in the X direction and the Y direction by driving Y-axis beam 26 and X-axis beams 27. Therefore, two mounting heads 28 pick up the components from the component suction positions of tape feeders 25 of corresponding component suppliers 24(1) and 24(2) respectively using suction nozzle 28a, and transfer and place the components at mounting points of board 23 which are positioned in board transport mechanism 22. That is, Y-axis beam 26, X-axis beams 27, and mounting heads 28 constitute component mounting mechanism 29 which picks up the components from component suppliers 24(1) and 24(2) by moving mounting heads 28 holding the components, and transfers and places the components on board 23.

Component recognition cameras 30 are disposed between component suppliers 24(1) and 24(2), and board transport mechanisms 22. When mounting heads 28 picking up the components from component suppliers 24(1) and 24(2) move above component recognition cameras 30, component recognition cameras 30 image and recognize the components which are in a state of being held in mounting heads 28.

Board recognition cameras 31, which are positioned on a lower surface side of X-axis beams 27 and integrally move with mounting heads 28 respectively, are mounted on mounting heads 28. Mounting heads 28 move and thereby board recognition cameras 31 move above board 23 positioned in board transport mechanisms 22, and image and recognize board 23. In the component mounting operation on board 23 by mounting head 28, placement position correction is performed taking account of a recognition result of the component by component recognition camera 30 and a recognition result of the board by board recognition camera 31.

FIG. 3A illustrates an apparatus operation surface in which component suppliers 24(1) and 24(2) are exposed in component mounter M1. Carriage 32 is set in component suppliers 24(1) and 24(2) in a state where a plurality of tape feeders 25 are mounted on feeder base 33 in advance. A position of carriage 32 is fixed in component suppliers 24(1) and 24(2) by clamping feeder base 33 with a clamping mechanism (not illustrated). A plurality of supply reels 34, which store carrier tapes 35 holding the components in a wound state, are held in carriage 32.

As described above, carriage 32 which is set in component suppliers 24(1) and 24(2) is a feeder arrangement unit on which the plurality of tape feeders 25 (feeders) are mounted. In feeder base 33, identification marks M (two in FIG. 3A) are located at positions visible from the outside of component mounter M1 in a state where carriage 32 is set in component suppliers 24(1) and 24(2). That is, identification marks M are located in the feeder arrangement unit. In each of identification marks M, a mark having a unique shape is printed and it is possible to identify carriage 32 by identification mark M.

Operator 36 including apparatus display 37 and apparatus input unit 38 is provided on the apparatus operation surface. Operation buttons 38a for performing various operation inputs are disposed at apparatus input unit 38. Apparatus display 37 is a display device such as a liquid crystal panel and various screens such as a guide screen for performing an operation input by apparatus input unit 38 are displayed. The screen includes work instruction information used for instructing set-up changing work associated with switching of a production type.

Next, a configuration and a function of tape feeder 25 will be described with reference to FIG. 3B. Tape feeder 25 includes body portion 25a and mounting portion 25b projected downward from a lower surface of body portion 25a. A so-called "attachment" operation of attaching tape feeder 25 to feeder base 33 is performed by sliding tape feeder 25 in a direction of arrow a with the lower surface of body portion 25a along feeder base 33. A so-called "detachment" operation of detaching tape feeder 25 from feeder base 33 is performed by sliding tape feeder 25 in a direction of arrow b from the state described above.

In a state where mounting tape feeder 25 is mounted, a connector portion provided in mounting portion 25b is fitted to feeder base 33. Therefore, tape feeders 25 are mounted on component suppliers 24(1) and 24(2) to be fixed and tape feeders 25 are electrically connected to apparatus controller 44 (see FIG. 4) of component mounter M1.

Tape feeding unit 39 including a tape feed mechanism for pitch-feeding carrier tape 35 is built in body portion 25a. Tape feeding unit 39 includes a drive mechanism for rotationally driving a sprocket for feeding the tape provided at a leading end of a tape guideway and feeder controller 40 for controlling the drive mechanism. Carrier tape 35 withdrawn from supply reel 34 is pitch-fed to a pickup position by suction nozzle 28a of mounting head 28 by tape feeding unit 39. A feeder ID code for identifying and specifying tape feeder 25 from others is stored in a storage device built in feeder controller 40. Therefore, apparatus controller 44 can individually identify each of tape feeders 25 mounted on feeder base 33.

That is, component mounting system 1 illustrated in the embodiment includes a feeder identification unit for identifying tape feeders 25 disposed in carriage 32 which is set in component suppliers 24(1) and 24(2). In the embodiment, whether a work result of the set-up changing work executed by the worker is correct or not is determined based on an identification result of the feeder identification unit. As a configuration of the feeder identification unit, in place of a configuration for detecting the feeder ID stored in individual tape feeder 25, a configuration, in which the worker reads manually identification information such as a barcode and an IC tag provided on supply reel 34 by using a reader terminal device, may be used.

Next, a configuration of a control system of component mounting system 1 (feeder arrangement support system) will be described with reference to FIG. 4. Host system 3 includes main controller 41 having a function as a management computer and main storage 42, and performs receiving and transmitting of a control signal and data between apparatuses configuring component mounting system 1 via communicator 43 and upper-side communicator 3a. Component mounters M1 to M3 have the same configuration and component mounter M1 will be described here. Component mounter M1 includes apparatus controller 44, apparatus storage 45, and collation processor 46, and is connected to communication network 2 via communicator 47.

Apparatus controller 44 is a calculation processor and controls board transport mechanism 22, component mounting mechanism 29, and component suppliers 24(1) and 24(2) based on production data 45a, that is, mounting data or feeder arrangement data stored for each board type to be produced, which is stored in apparatus storage 45. Therefore, component mounting work for mounting the component picked up from each tape feeder 25 of component suppliers 24(1) and 24(2) on board 23 is executed.

Feeder detector 48 has a feeder detection function realized by reading the feeder ID stored in feeder controller 40 by apparatus controller 44. Collation processor 46 has a function of comparing a feeder identification result detected for each feeder address 24a by feeder detector 48 with feeder data defined by production data 45a, and collating whether or not tape feeder 25 attached to each feeder address 24a is correct tape feeder 25 to be originally attached to feeder address 24a. Apparatus input unit 38 and apparatus display 37 are provided in operator 36 of the apparatus operation surface illustrated in FIG. 3A, and perform operation and data input, and display of various operation and guide screens necessary during each operation.

Figure 4:
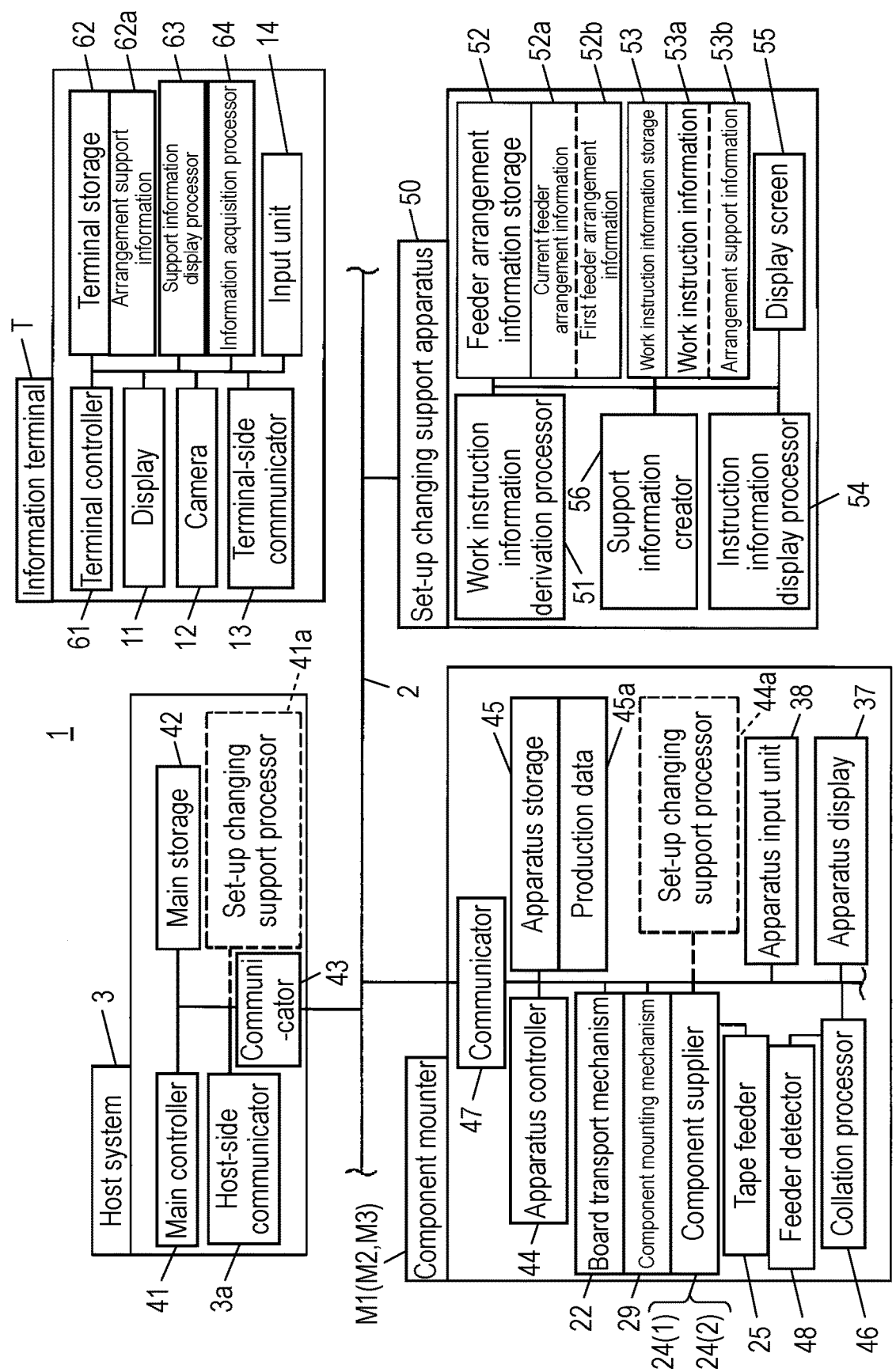
FIG. 4 is a block diagram illustrating a configuration of a control system of the component mounting system of an embodiment of the disclosure.

In FIG. 4, set-up changing support apparatus 50 has a function of performing creation of various types of information or the like referred to efficiently and easily execute the set-up changing work such as replacement or rearrangement of tape feeders 25 required in component suppliers 24(1) and 24(2) in accordance with switching of a product type of production. Set-up changing support apparatus 50 includes processing function units of work instruction information derivation processor 51, feeder arrangement information storage 52, work instruction information storage 53, instruction information display processor 54, display screen 55, and support information creator 56.

Feeder arrangement information storage 52 stores feeder arrangement information corresponding to an arrangement state of tape feeders 25 mounted on carriage 32 (feeder arrangement unit) which is set in component suppliers 24(1)

and 24(2), or carriage 32 detached from component mounters M1 to M3 in association with identification mark M attached to carriage 32. The feeder arrangement information includes current feeder arrangement information 52a corresponding to an arrangement state of tape feeders 25 currently mounted on carriage 32 which is set in component suppliers 24(1) and 24(2), and first feeder arrangement information 52b corresponding to a first arrangement state targeting a next production board type (first board type) scheduled for the next production.

Work instruction information derivation processor 51 derives work instruction information 53a defining the set-up changing work required for changing the arrangement state of tape feeders 25 in carriage 32 which is set in component suppliers 24(1) and 24(2) from the current state to the first arrangement state based on current feeder arrangement information 52a and first feeder arrangement information 52b. Derived work instruction information 53a is stored in work instruction information storage 53. Instruction information display processor 54 performs a process of reading work instruction information 53a from work instruction information storage 53 and displaying work instruction information 53a on display screen 55 according to a predetermined display format.

Support information creator 56 creates arrangement support information 53b for supporting the arrangement of tape feeders 25 (feeders) on the feeder arrangement unit (carriage 32) in response to a request from information terminal T based on work instruction information 53a. Created arrangement support information 53b is stored in work instruction information storage 53 and is transmitted to information terminal T via host-side communicator 3a of host system 3.

Although an example in which an independent apparatus having independent processing calculation function and storage device such as a personal computer is used as set-up changing support apparatus 50 is illustrated here, a specific embodiment of the disclosure is not limited to such a configuration and various variations can be performed. For example, the function of set-up changing support apparatus 50 may be included in host system 3 so as to function as set-up changing support processor 41a. The function of set-up changing support apparatus 50 may be attached to each of component mounters M1 to M3 so as to function as set-up changing support processor 44a. In this case, as display screen 55, apparatus display 37 provided on the apparatus operation surface can be used.

In FIG. 4, information terminal T includes terminal controller 61, terminal storage 62, support information display processor 63, information acquisition processor 64, display 11, camera 12, terminal-side communicator 13, and input unit 14. Terminal controller 61 controls each unit of information terminal T based on a control program stored in terminal storage 62. Terminal storage 62 stores various types of information such as arrangement support information 62a in addition to the control program.

Information acquisition processor 64 specifies carriage 32 by recognizing identification mark M attached to carriage 32 imaged by camera 12 and acquires various types of information regarding carriage 32 from set-up changing support apparatus 50 via terminal-side communicator 13. Various types of information acquired by information acquisition processor 64 include arrangement position information of carriage 32, information on whether or not tape feeder 25 is a set-up changing target, arrangement support information 53b in a case of the set-up changing target, and the like. Arrangement support information 53b acquired from set-up changing support apparatus 50 is stored in terminal storage 62 as arrangement support information 62a.

In the arrangement position information of carriage 32, in a case of being set in component mounters M1 to M3, information specifying component mounters M1 to M3 which are set and component suppliers 24(1) and 24(2) which are set is included, and in a case of being detached from component mounters M1 to M3, information of a storage location of carriage 32 or the like is included. As described above, information acquisition processor 64 acquires information regarding the feeder arrangement unit by specifying the feeder arrangement unit, based on identification mark M attached to the feeder arrangement unit (carriage 32) imaged by camera 12 (imaging unit).

In FIG. 4, support information display processor 63 displays arrangement support information 62a for supporting the arrangement of tape feeders 25 (feeders) on the feeder arrangement unit (carriage 32) to be superimposed on the field of view of the worker wearing information terminal T on display 11. Arrangement support information 62a displayed by support information display processor 63 includes information regarding detachment work for detaching tape feeders 25 (feeders) from the feeder arrangement unit, attachment work for attaching tape feeders 25 (feeders) to the feeder arrangement unit, movement work for moving tape feeders 25 (feeders) on the feeder arrangement unit, and a work sequence of the detachment work, the attachment work, and the movement work.

Support information display processor 63 recognizes the positions of tape feeders 25 (feeders) in the feeder arrangement unit (carriage 32) and displays the information specifying the positions of tape feeders 25 of the work target to be superimposed on the field of view of the worker on display 11 based on the position of identification mark M imaged by camera 12.

Next, a data configuration of work instruction information 53a will be described with reference to FIG. 5. In FIG. 5, work instruction information 53a is prepared every time the set-up changing work in accordance with switching of the board type of the production target, and unit work information 70 defining work contents to be executed by the worker for individual tape feeder 25 to be worked is displayed in the order of "work sequence" 71 to execute work. That is, unit work information 70 includes each item of "work sequence" 71, "operation type" 72, "current state" 73, "next production" 74, "component name" 75, "reel" 76, "number of necessary components" 77, and "comment" 78.

"Operation type" 72 is type information indicating the type of the execution operation performed in unit work information 70 in the set-up changing work. In the embodiment, as operation information, "detachment" (see arrow b illustrated in FIG. 3B) indicating the execution operation of detaching already arranged tape feeders 25 in carriage 32, "attachment" (see arrow a illustrated in FIG. 3B) indicating the execution operation of arranging new tape feeders 25 in carriage 32, and "movement" for rearranging tape feeders 25 to another feeder address 24a as it is after detaching tape feeders 25 from carriage 32 once are defined.

In the example illustrated in FIG. 5, as "work sequence" 71, the work on carriage 32 which is set in component supplier 24(1) is firstly performed, the work on carriage 32 which is set in component supplier 24(2) is performed in the latter order, and tape feeders 25 capable of operating in component suppliers 24(1) and 24(2) are arranged in the order of arrangement. Therefore, it is possible to prevent erroneous work by the worker and to efficiently execute the set-up changing work.

"Current state" 73 indicates a feeder state (current status) before the work execution of tape feeders 25 as the work target in the set-up changing work. "Next production" 74 indicates the feeder state (status in the next production) after the work execution. For example, unit work information 70 in which "work sequence" 71 is "1" indicates that "detachment" from carriage 32 for tape feeders 25 arranged in feeder address 24a of "1-13R" in the current state is executed, and tape feeders 25 should be temporarily stored in a work shelf or the like disposed in the vicinity of component mounting system 1 integrally with supply reel 34 in order to reuse tape feeders 25 after the next production.

Unit work information 70 in which "work sequence" 71 is "2" indicates that tape feeders 25 mounted on feeder address 24a of "1-14R" in the current state are detached once and "movement" for remounting tape feeders 25 in feeder address 24a of "1-2L" as for the next production should be executed. Unit work information 70 in which "work sequence" 71 is "5" indicates that "operation type" 72 is "attachment", "current state" 73 is "new" in here, that is, tape feeders 25 stored in a material storage or the like are newly picked up, and tape feeders 25 are newly attached to feeder address 24a of "1-13R" defined in "next production" 74 to be arranged.

"Component name" 75 attached to each unit work information 70 indicates a component name of the component supplied by tape feeder 25. "Reel" 76 indicates the identification number recorded in identification information such as a bar code attached to supply reel 34 used in tape feeder 25. "Number of necessary components" 77 indicates an expected quantity of the number of components required for the production after the next production. In "comment" 78, various types of instruction information supplementarily required in the set-up changing work, for example, in a case where "reuse" is designated in "next production" 74, the shelf number for specifying positions in which detached tape feeders 25 are temporarily stored, or the like is displayed.

Figure 6A:
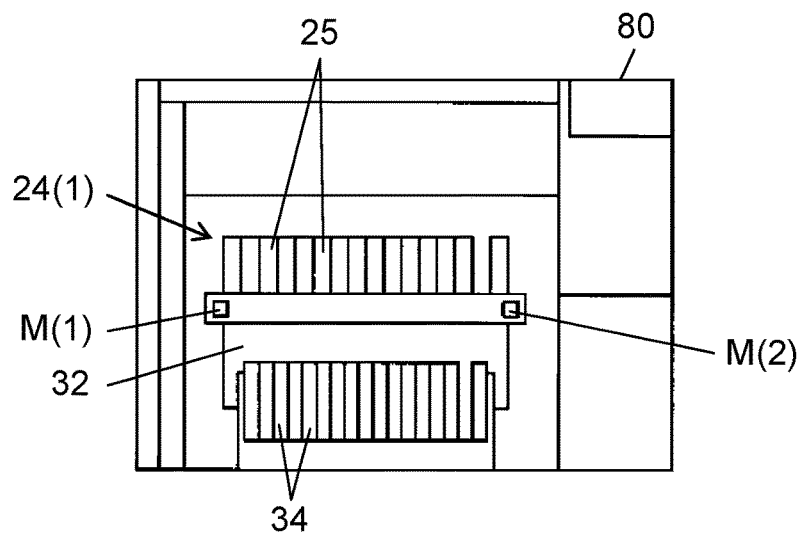
FIG. 6A is a view illustrating an example of an image outside an information terminal displayed on the information terminal in the set-up changing work in the component mounting system of an embodiment of the disclosure.

Next, arrangement support information 62a displayed on display 11 of information terminal T will be described with reference to FIGS. 6A to 7B. On display 11 of information terminal T, partial information of unit work information 70 as arrangement support information 62a is indicated in the order of "work sequence" 71 based on work instruction information 53a illustrated in FIG. 5. FIG. 6A illustrates an example of image 80 outside information terminal T visible to the worker through the half mirror of display 11 when the worker wearing information terminal T watches the vicinity of carriage 32 which is the set-up changing target which is set in component supplier 24(1). A similar image is also imaged by camera 12 of information terminal T and identification mark M(1) and identification mark M(2) in the image of camera 12 are recognized by information acquisition processor 64.

Figure 6B:
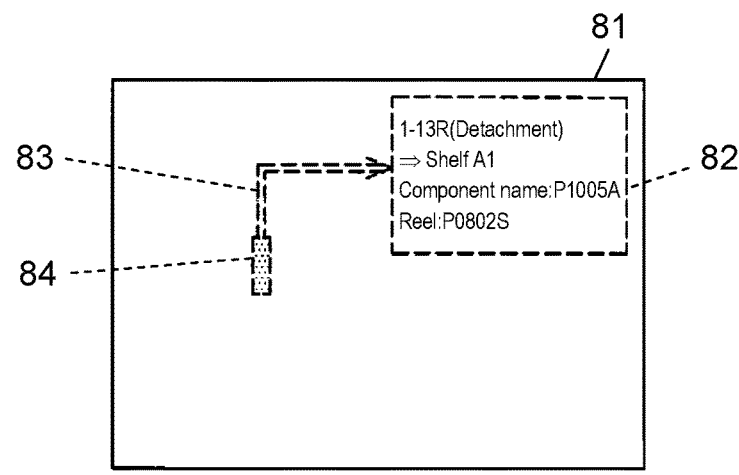
FIG. 6B is a view illustrating an example of arrangement support information displayed on the information terminal in the set-up changing work in the component mounting system of an embodiment of the disclosure.

FIG. 6B illustrates an example of image 81 projected on display 11 by support information display processor 63 to be superimposed on the field of view of the worker. Here, arrangement support information 62a (unit work information 70) in which "work sequence" 71 of work instruction information 53a illustrated in FIG. 5 is "1" is displayed. In image 81, arrangement support information 62a includes text information 82 including information of "operation type" 72, "current state" 73, "next production" 74, "component name" 75, "reel" 76, and "comment" 78, arrow 83 visually indicating the information (here, "detachment") of "operation type" 72, and position information 84 visually indicating the position of tape feeder 25 as the unit work target.

Figure 6C:
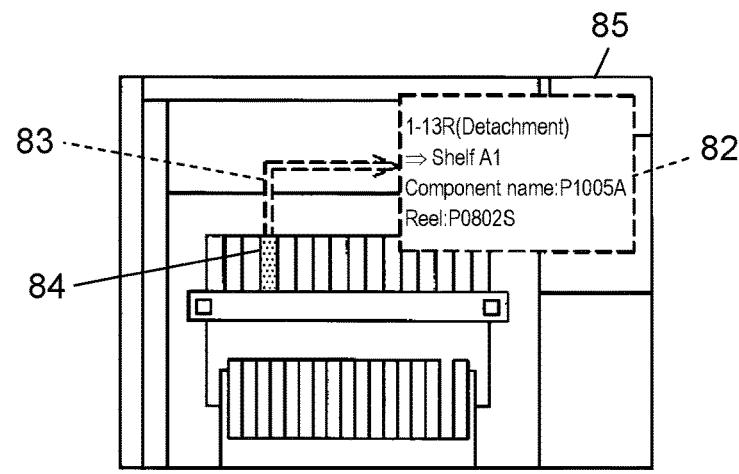
FIG. 6C is a view illustrating an example of an image reflected on a field of view of a worker displayed on the information terminal in the set-up changing work in the component mounting system of an embodiment of the disclosure.

FIG. 6C illustrates an example of image 85 displayed on display 11 which is visibly recognized by the worker wearing information terminal T, and image 81 projected by support information display processor 63 illustrated in FIG. 6B is to be superimposed on outside image 80 watched through the half mirror illustrated in FIG. 6A. As described above, in display 11, arrangement support information 62a for supporting the arrangement of tape feeders 25 (feeders) on the feeder arrangement unit (carriage 32) is displayed to be superimposed on the field of view of the worker wearing information terminal T. It is possible to display arrangement support information 62a such as position information 84 more accurately to be superimposed at a predetermined position of image 80 by attaching the plurality of identification marks M(1) and M(2) to the feeder arrangement unit.

Figure 7A:
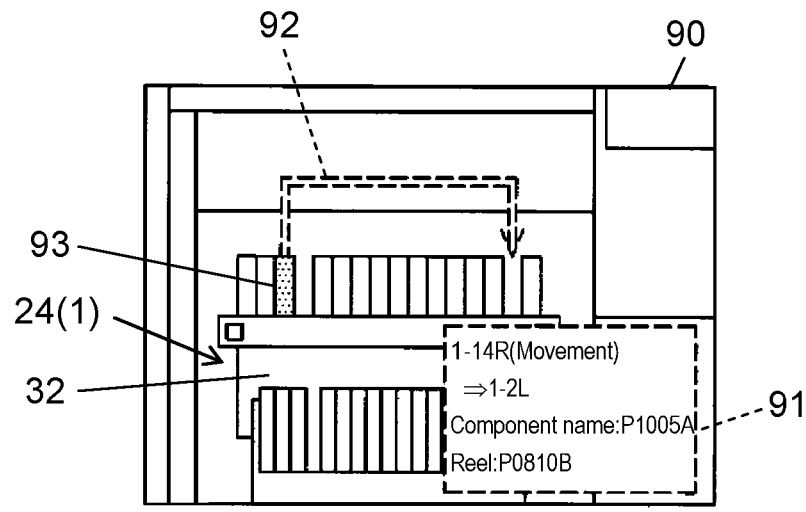
FIG. 7A is a view illustrating an example of an image reflected on the field of view of the worker displayed on the information terminal in the set-up changing work in the component mounting system of an embodiment of the disclosure.

FIG. 7A illustrates an example of image 90 in which arrangement support information 62a (unit work information 70) in which "work sequence" 71 of work instruction information 53a illustrated in FIG. 5 is "2" is displayed to be superimposed on display 11. Here, the information of "operation type" 72 is "movement" and in addition to text information 91, arrow 92 visually indicating "1-14R" in feeder address 24a of a movement source and "1-2L" in feeder address 24a of a movement destination, and position information 93 visually indicating the position of tape feeder 25 in "1-14R" of the movement source are displayed to be superimposed.

Figure 7B:
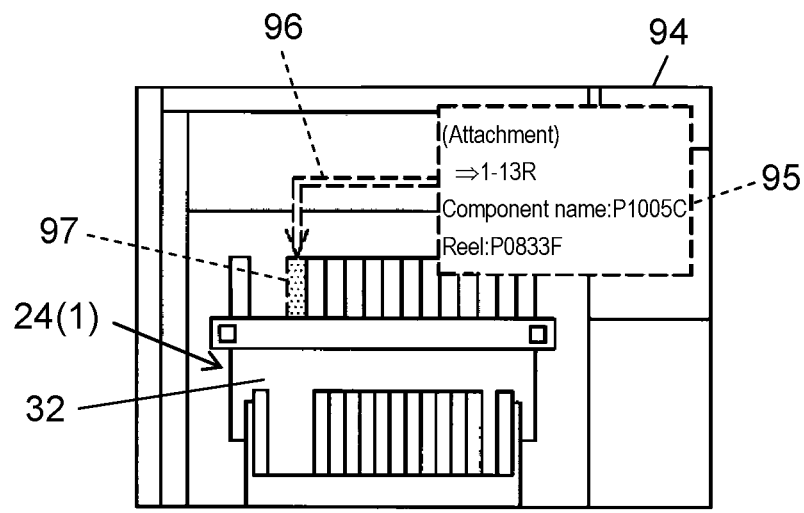
FIG. 7B is a view illustrating an example of an image reflected on the field of view of the worker displayed on the information terminal in the set-up changing work in the component mounting system of an embodiment of the disclosure.

FIG. 7B illustrates an example of image 94 in which arrangement support information 62a (unit work information 70) in which "work sequence" 71 of work instruction information 53a illustrated in FIG. 5 is "5" is displayed to be superimposed on display 11. Here, the information of "operation type" 72 is "attachment" and in addition to text information 95, arrow 96 visually indicating "1-13R" in feeder address 24a of an attachment destination and position information 97 visually indicating the position of "1-13R" of the attachment destination are displayed to be superimposed.

As described above and as illustrated in FIGS. 6A to 7B, support information display processor 63 displays arrangement support information 62a for supporting the arrangement of tape feeders 25 (feeders) on the feeder arrangement unit to be superimposed according to the work sequence, based on arrangement support information 62a regarding the feeder arrangement unit (carriage 32) specified by information acquisition processor 64. Therefore, the worker can intuitively grasp the set-up changing work and execute the set-up changing work in order of work efficiency.

As described above, component mounting system 1 of the embodiment includes camera 12 (imaging unit), display 11 which displays arrangement support information 62a to be superimposed on the field of view of the worker based on the information imaged by camera 12 (imaging unit), and support information display processor 63 which displays arrangement support information 62a to be superimposed on display 11. Component mounting system 1 configures the feeder arrangement support system for supporting the arrangement of tape feeders 25 (feeders) on the feeder arrangement unit by the worker. Therefore, the worker intuitively grasps the set-up changing work, thereby reducing labor of finding tape feeders 25 (feeders).

Next, a method for supporting a feeder arrangement for supporting the arrangement of tape feeders 25 (feeders) on the feeder arrangement unit (carriage 32) by the worker in component mounting system 1 (feeder arrangement support system) will be described with reference to FIG. 8. The change of the feeder arrangement is executed when changing the set-up for changing the board type produced by component mounting system 1. When changing the set-up, the worker puts tape feeder 25 and supply reel 34 to be exchanged on a transportation vehicle or the like and moves tape feeder 25 and supply reel 34 in front of component suppliers 24(1) and 24(2) of component mounters M1 to M3 which are the work targets.

When the worker wearing information terminal T points the direction of carriage 32 which is set in component suppliers 24(1) and 24(2) recognized as the work targets, identification mark M attached to carriage 32 is imaged by camera 12. When identification mark M is imaged, information acquisition processor 64 specifies carriage 32 by recognizing identification mark M (ST1). Next, information acquisition processor 64 transmits the information of specified carriage 32 to set-up changing support apparatus 50 and acquires various types of information regarding carriage 32 (feeder arrangement unit) which is set in component suppliers 24(1) and 24(2) (ST2). That is, information acquisition processor 64 acquires information regarding the feeder arrangement unit by specifying the feeder arrangement unit based on identification mark M attached to the feeder arrangement unit (carriage 32) to be imaged.

When information acquisition processor 64 acquires arrangement support information 62a, in carriage 32 to be the set-up changing target, support information creator 56 of set-up changing support apparatus 50 creates arrangement support information 53b (arrangement support information 62a) including information regarding the detachment work for detaching tape feeders 25 (feeders) from the feeder arrangement unit (carriage 32), the attachment work for attaching tape feeders 25 (feeders) to the feeder arrangement unit, the movement work for moving tape feeders 25 (feeders) on the feeder arrangement unit, and the work sequence of the detachment work, the attachment work, and the movement work.

In FIG. 8, next, in a case where carriage 32 to be imaged is not the set-up changing target (No in ST3), in support information display processor 63, a fact that carriage 32 (feeder arrangement unit) is not the set-up changing target and information (for example, a map indicating the position of the feeder arrangement unit, an arrow indicating the direction thereof, or the like) indicating the position of the feeder arrangement unit of the set-up changing target are displayed to be superimposed on display 11. The process returns to (ST1) and waits until identification mark M of next carriage 32 is imaged.

In a case where carriage 32 to be imaged is the set-up changing target (Yes in ST3), support information display processor 63 displays arrangement support information 62a (unit work information 70) to be superimposed on display 11 (ST4). That is, support information display processor 63 displays arrangement support information 62a for supporting the arrangement of tape feeders 25 (feeders) on the feeder arrangement unit to be superimposed on the field of view of the worker in the display based on information imaged by camera 12 (imaging unit) (for example, see FIG. 6C). Therefore, the worker can intuitively grasp the set-up changing work.

Next, the feeder arrangement support system (component mounting system 1) waits until unit work in which tape feeders 25 are mounted on feeder address 24a that is a target of the unit work is completed (No in ST5). For example, when feeder detectors 48 of component mounters M1 to M3 detects that tape feeders 25 are mounted and collation processors 46 confirm that tape feeders 25 are predetermined tape feeder 25, it is determined that the unit work is completed. Alternatively, when the worker inputs the completion of the unit work into input unit 14 of information terminal T, it is determined that the unit work is completed.

In FIG. 8, when it is determined that the unit work is completed (Yes in ST5), whether or not all the set-up changes of the feeder arrangement unit are completed is determined (ST6). For example, when all unit work information 70 of arrangement support information 62a to be acquired is executed, it is determined that the set-up change is completed in the feeder arrangement unit. In a case where the set-up change in the feeder arrangement unit is not completed (No in ST6), the process returns to (ST4) and next unit work information 70 (arrangement support information 62a) is displayed to be superimposed on display 11. It is possible to prevent erroneous work by displaying the contents of the work for each unit work.

In a case where the set-up change is completed in the feeder arrangement unit (Yes in ST6), if there is a feeder arrangement unit to be another set-up changing target (Yes in ST7), the process returns to (ST1) and the set-up changing work is executed in the next feeder arrangement unit. That is, support information display processor 63 displays arrangement support information 62a for supporting the arrangement of tape feeders 25 (feeders) to be superimposed on the feeder arrangement unit according to the work sequence, based on arrangement support information 62a regarding the specified feeder arrangement unit (carriage 32). Therefore, it is possible to execute the set-up changing work in order of work efficiency. When the set-up changing work is completed in all the feeder arrangement units of component mounters M1 to M3 (No in ST7), the set-up changing work is completed in component mounting system 1.

As described above, in the method for supporting a feeder arrangement of the embodiment, arrangement support information 62a for supporting the arrangement of tape feeders 25 (feeders) on the feeder arrangement unit (carriage 32) is prepared and arrangement support information 62a is displayed to be superimposed on the field of view of the worker in display 11 of information terminal T mounted on the worker. Therefore, the worker intuitively grasps the set-up changing work, thereby reducing labor of finding tape feeders 25 (feeders). The display of arrangement support information 62a on display 11 is not limited to the display for each type of unit work information 70. For example, all the set-up changing work with respect to same carriage 32 may be displayed in a form of a table.

Figure 9:
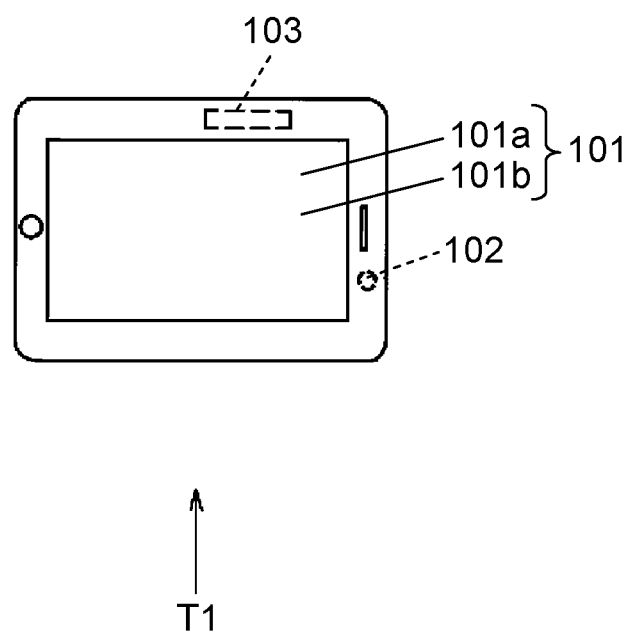
FIG. 9 is an explanatory view of a second example of the information terminal used in the component mounting system of an embodiment of the disclosure.

Next, a second example of information terminal T used in component mounting system 1 (feeder arrangement support system) of the embodiment will be described with reference to FIG. 9. Information terminal T1 of the second example is a smart phone, a tablet PC, or the like, and includes touch panel 101, camera 102, and terminal-side communicator 103. Touch panel 101 has a function of combining display 101a such as a liquid crystal panel or an organic EL panel, and input unit 101b such as a touch pad, displaying the image of camera 102 or various types of information, and inputting an operation command or various types of data. Camera 102 is an imaging unit for imaging a moving image or a still image.

A lens of camera 102 is provided so as to be opened on the opposite side to touch panel 101 and when camera 102 is directed to a desired direction to be imaged, the captured image is displayed on touch panel 101. In information terminal T1 of the second example, when carriage 32 (feeder arrangement unit) which is set in component suppliers 24(1) and 24(2) of the work target is imaged by camera 102 in the set-up changing work, the display on touch panel 101 (display 101a) is different from information terminal T of the first example.

That is, in display 101a of information terminal T1 of the second example, when identification mark M attached to carriage 32 is imaged by camera 102, arrangement support information 62a for supporting the arrangement of tape feeders 25 (feeders) on the feeder arrangement unit is displayed to be superimposed on the image of the feeder arrangement unit (carriage 32) by support information display processor 63 based on information imaged by camera 102 (imaging unit).

That is, in information terminal T1 of the second example, image 80 outside information terminal T illustrated in FIG. 6A is the image captured by camera 102, arrangement support information 62a similar to that of FIG. 6B is superimposed, and the display similar to that of FIG. 6C is displayed on touch panel 101 (display 101a). Therefore, the worker intuitively grasps the set-up changing work, thereby reducing labor of finding tape feeders 25 (feeders).

In information terminal T1 of the second example, when identification mark M attached to carriage 32 is recognized, the image of the feeder arrangement unit (carriage 32) is recorded as a still image, and the same arrangement support information 62a as that of FIG. 6B may be displayed to be superimposed on the still image (image obtained by imaging the feeder unit). Therefore, the worker places information terminal T1 of the second example displaying the still image on the transportation vehicle and can execute the set-up changing work of tape feeders 25 or the like with both empty hands while referring arrangement support information 62a displayed to be superimposed on the still image displayed on touch panel 101 (display 101a).

In the description of the feeder arrangement support system and the method for supporting a feeder arrangement, the target of the set-up changing work is carriage 32 (feeder arrangement unit) which is set in component suppliers 24(0 and 24(2) of component mounters M1 to M3, but carriage 32 detached from component mounters M1 to M3 may be the target of the set-up changing work. That is, the set-up changing work, in which tape feeders 25 (feeders) of carriage 32 (spare carriage) detached from component mounters M1 to M3 are previously arranged to correspond to the next production board type, can be also applied to a so-called external set-up in which carriage 32 which is set in component mounters M1 to M3 is exchanged for carriage 32 (spare carriage).

Conclusion

As described above, component mounting system 1 (feeder arrangement support system) in the embodiment supports the arrangement of feeders 25 on carriage 32 (feeder arrangement unit). Component mounting system 1 includes camera 12 (imaging unit) that images information, support information display processor 63 that generates a superimposed composite image by superimposing arrangement support information for supporting the feeder arrangement on the feeder arrangement unit on an image obtained by imaging the feeder arrangement unit or a field of view of a worker, and display 11 that displays the superimposed composite image.

The method for supporting a feeder arrangement in the embodiment supports the arrangement of the feeders 25 on carriage 32. The method for supporting the arrangement of feeders includes preparing arrangement support information for supporting the arrangement of feeders 25 on carriage 32 and generating the superimposed composite image by superimposing the arrangement support information on the image obtained by imaging carriage 32 or the field of view of the worker, and displaying the superimposed composite image in display 11.

The feeder arrangement support system and the method for supporting a feeder arrangement of the disclosure have an effect that the worker can intuitively grasp the set-up changing work and are useful in a component mounting field where components are mounted on a board.

What is claimed is:

1. A feeder arrangement support system which supports an arrangement of a plurality of feeders on a feeder arrangement unit, the system comprising an eyeglass type wearable information terminal with:
   an imaging unit that images information by imaging at least one identification mark attached to the feeder arrangement unit;
   an information acquisition processor that acquires arrangement support information from the at least one identification mark attached to the feeder arrangement unit, the arrangement support information including whether the feeder arrangement unit is a set-up changing target;
   a support information display processor that generates a superimposed composite image by superimposing work instruction information for supporting the feeder arrangement on the feeder arrangement unit on the information imaged by the imaging unit when the at least one identification mark attached to the feeder arrangement unit indicates that the feeder arrangement unit is a set-up changing target; and
   a display that displays the superimposed composite image to a worker wearing the eyeglass type wearable information terminal, the superimposed composite image including position information of a target feeder of the plurality of feeders and a work sequence for the target feeder.

2. The feeder arrangement support system of claim 1, the eyeglass type wearable information terminal further comprising:
   a support information creator which creates the arrangement support information,
   wherein the arrangement support information includes the work instruction information regarding detachment work for detaching the feeder from the feeder arrangement unit, attachment work for attaching the feeder to the feeder arrangement unit, movement work for moving the feeder on the feeder arrangement unit, and a work sequence of the detachment work, the attachment work, and the movement work.

3. The feeder arrangement support system of claim 2, wherein the support information display processor of the eyeglass type wearable information terminal displays the arrangement support information for supporting the feeder arrangement on the feeder arrangement unit to be superimposed according to the work sequence, based on the arrangement support information regarding the feeder arrangement unit specified by the information acquisition processor.

4. A method for supporting a feeder arrangement for supporting an arrangement of a plurality of feeders on a feeder arrangement unit, the method comprising using an eyeglass type wearable information terminal for:
   imaging the feeder arrangement unit or a field of view of a worker, imaging at least one identification mark attached to the feeder arrangement unit by the eyeglass type wearable information terminal, the at least one identification mark including information regarding whether the feeder arrangement unit is a set-up changing target;

after imaging the at least one identification mark, acquiring arrangement support information from the at least one identification mark, including whether the feeder arrangement unit is a set-up changing target;

after determining that the feeder arrangement unit is a set-up changing target, generating a superimposed composite image by superimposing set-up changing work instruction information for the feeder arrangement unit on the image obtained by imaging the feeder arrangement unit or the field of view of a worker; and displaying the superimposed composite image on a display, the superimposed composite image including position information of a target feeder of the plurality of feeders and a work sequence for the target feeder.

5. The method for supporting a feeder arrangement of claim 4,
wherein the set-up changing work instruction information includes information regarding detachment work for detaching the feeder from the feeder arrangement unit, attachment work for attaching the feeder to the feeder arrangement unit, movement work for moving the feeder on the feeder arrangement unit, and a work sequence of the detachment work, the attachment work, and the movement work is created.

6. The method for supporting a feeder arrangement of claim 5,
wherein the set-up changing work instruction information is displayed on the eyeglass type wearable information terminal to be superimposed according to the work sequence, based on the arrangement support information regarding the specified feeder arrangement unit.

7. The feeder arrangement support system of claim 1, wherein the superimposed image is an image of the work instruction information placed over the image obtained by imaging the feeder arrangement unit or a field of view of a worker in a manner that both images are seen on the display.

8. The method for supporting a feeder arrangement of claim 4, wherein the superimposed image is an image of the work instruction information placed over the image obtained by imaging the feeder arrangement unit or a field of view of a worker in a manner that both images are seen on the display.

9. The method for supporting a feeder arrangement of claim 4, wherein the superimposed image supports set-up changing work executed by the worker.

10. The feeder arrangement support system of claim 1, wherein the worker performs set-up changing work that includes detachment of an already arranged feeder, a change of the feeder arrangement, and attachment of a new feeder.

11. The method for supporting a feeder arrangement of claim 4, wherein a set-up changing work is executed by a worker.

12. The method for supporting a feeder arrangement of claim 4, wherein the worker performs set-up changing work that includes detachment of an already arranged feeder, a change of the feeder arrangement, and attachment of a new feeder.

* * * * *